Feb. 4, 1969   W. L. McGINLEY   3,425,341
HAMBURGER BROILER
Filed Oct. 3, 1966   Sheet 1 of 3
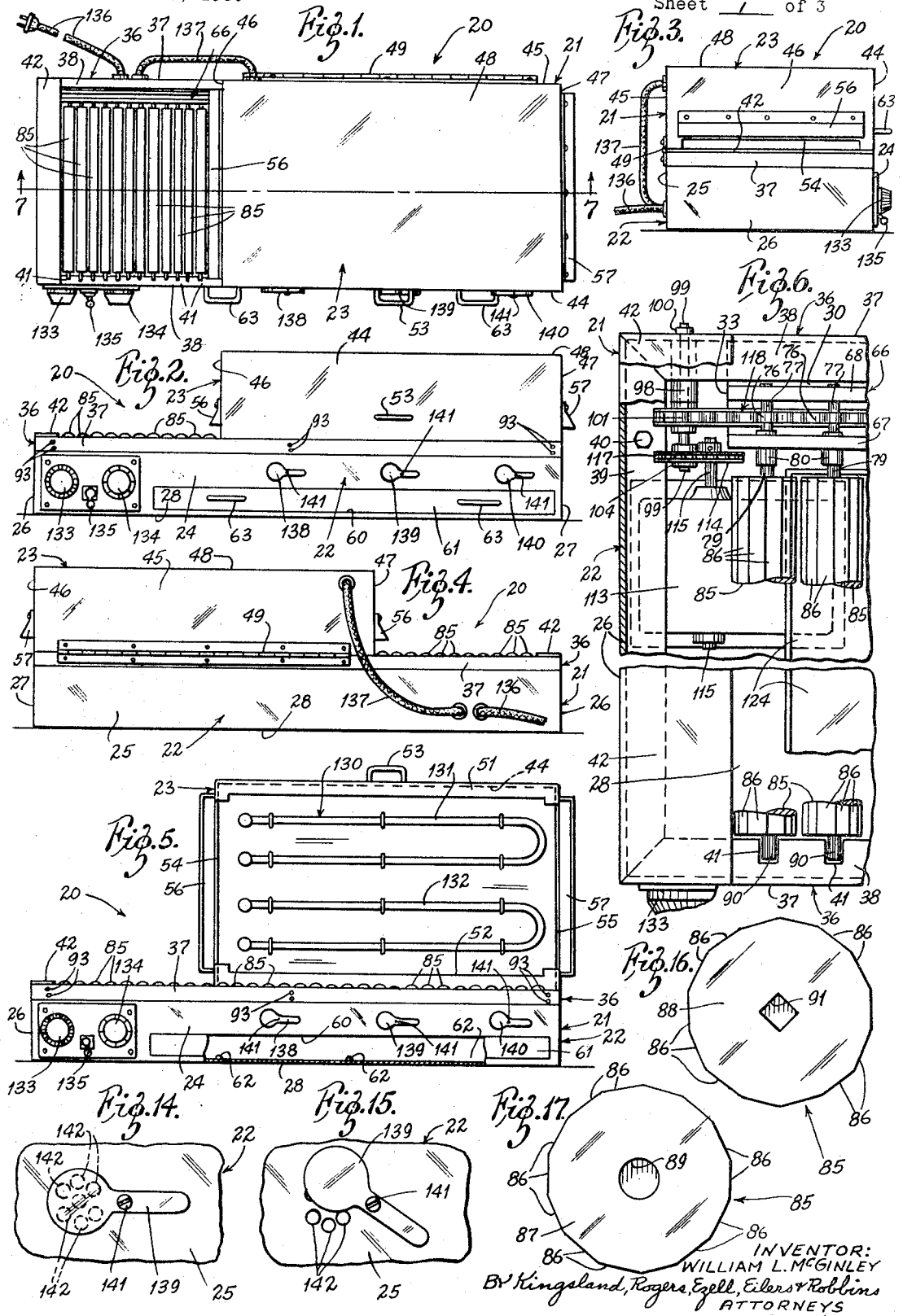
INVENTOR:
WILLIAM L. McGINLEY
By Kingsland, Rogers, Ezell, Eilers & Robbins
ATTORNEYS

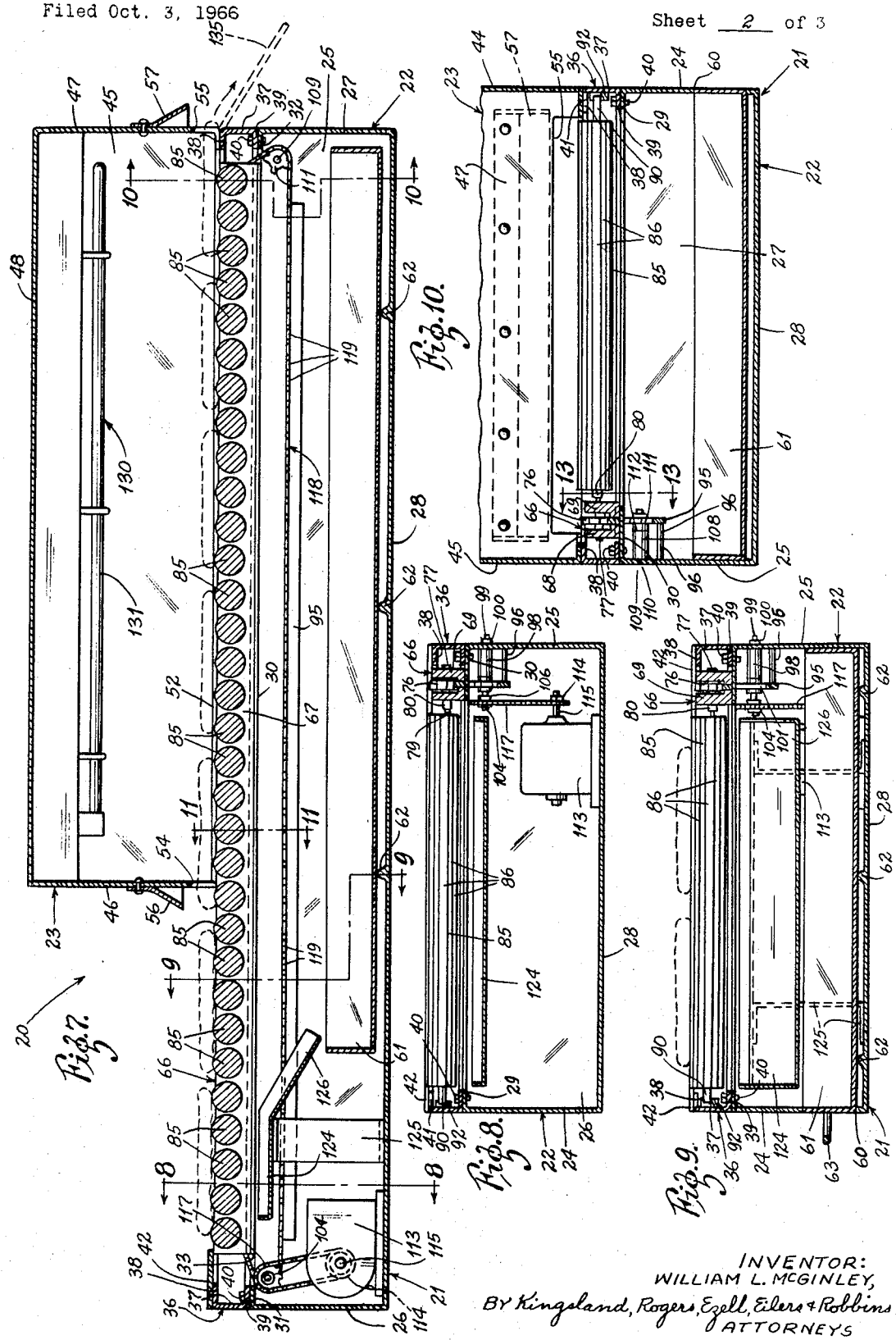

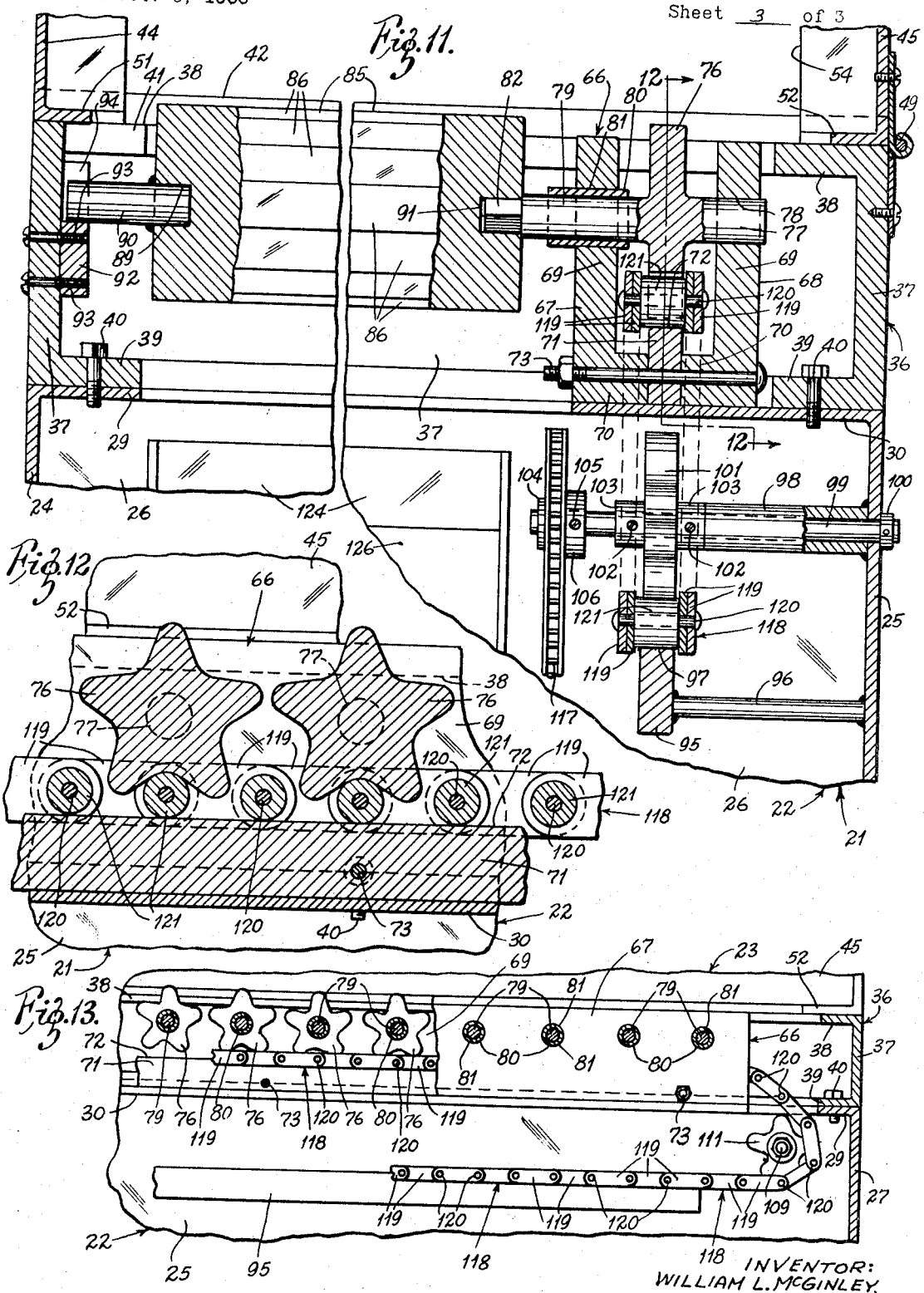

United States Patent Office 3,425,341
Patented Feb. 4, 1969

1

3,425,341
HAMBURGER BROILER
William L. McGinley, 6142 Averill Way,
Dallas, Tex. 75225
Filed Oct. 3, 1966, Ser. No. 583,515
U.S. Cl. 99—423                                11 Claims
Int. Cl. A47j 37/04; A21b 1/40; F27b 9/14

ABSTRACT OF THE DISCLOSURE

A fully automatic broiler and grill that simutaneously broils and grills hamburgers or other meats as the hamburgers are conveyed through a cooking area. A housing for a cooking area and a row of individual rotatable grid rollers which transfer hamburger patties over the upper surfaces of the rollers in succession, carrying the patties through the cooking area at a predetermined rate of travel where controlled heat radiated from the heating units in the cooking area broils the hamburgers from above and heats the grid rollers to grill the hamburgers from below.

Brief description of the invention

In general, this broiler and grill comprises a housing with a plurality of grid rollers rotatably mounted in a row progressing over the entire length of the housing. A power driven sprocket chain rotates the grid rollers uniformly in the same direction to carry hamburger patties from a loading end of the housing at a uniform speed to the discharge end. A cooking area is defined beneath a hood hinged to the housing and having a heating assembly of coils or gas burners in it. The heating assembly radiates heat downwardly onto the meat and onto the rollers to both heat the rollers and broil the meat. The heated rollers convey the hamburger patties through the cooking area and at the same time grill the undersurfaces of the hamburgers. The rotation of the grid rollers prevents the meat from sticking to them.

Individual temperature controls permit adjustment of the temperature of different areas within the heater assembly to permit different degrees of heating or cooking, such as for simultaneously cooking some of the hamburgers medium-well and others medium-rare, or for cooking hamburgers in one row and steaks in another row, or for simultaneously cooking a row of hamburgers and toasting a row of hamburger buns. In addition, a variable speed motor permits changes in the speed of rotation of the grid rollers to vary the duration of travel of food through the cooking area and thereby to vary the cooking time.

The principal object of this invention is to provide a broiler and grill for broiling and grilling hamburgers, with a conveyor comprising a plurality of rollers for conveying the hamburger patties through the cooking area while simultaneously broiling and grilling the hamburgers and at the same time, by their rotation, preventing sticking of the meat to the rollers.

Another important object of the invention is to provide a broiler and grill that automatically cooks hamburgers to any desired degree while maintaining most of the meat juices in the hamburgers, all with automatic conveying and cooking of the patties.

Another object of the invention is to provide a broiler and grill comprising a housing having a cooking area and having rollers for carrying food to be cooked through the cooking area, with a sprocket chain drive for rotating the rollers and with structure for maintaining positive contact between the sprocket chain and the sprocket wheels which are connected to the rollers.

Another object is to provide a broiler and grill comprising a housing having a cooking area and a plurality of stationary but rotatable grid rollers for conveying food through the cooking area, wherein the cooking area has separate heating elements with separate temperature controls to enable independent regulation of cooking temperatures in different parts of the cooking area, and wherein the speed of rotation of the grid rollers can be varied to vary cooking times. An additional object is to provide such a broiler and grid wherein the cross-section of the grid rollers is a flat-sided polygon to improve the conveying capabilities of the grid rollers.

In the drawings:
FIGURE 1 is a top plan view of the broiler and grill;
FIGURE 2 is a front elevation view of the broiler and grill;
FIGURE 3 is an elevation view of the loading end of the broiler and grill;
FIGURE 4 is a rear elevation view of the broiler and grill;
FIGURE 5 is a front elevation view of the broiler and grill with the broiler hood raised and the grease collection pan removed, and with parts shown in section;
FIGURE 6 is an enlarged top plan view of the motor drive assembly with parts shown in section;
FIGURE 7 is an enlarged view in section taken along the line 7—7 of FIGURE 1, but with the grid rollers shown round in cross-section for ease of illustration, whereas FIGURES 16 and 17 show their actual polygonal shapes;
FIGURE 8 is a view in section taken along the line 8—8 of FIGURE 7;
FIGURE 9 is a view in section taken along the line 9—9 of FIGURE 7;
FIGURE 10 is a fragmentary view in section taken along the line 10—10 of FIGURE 7;
FIGURE 11 is an enlarged fragmentary view in section taken along the line 11—11 of FIGURE 7;
FIGURE 12 is a fragmentary view in section taken along the line 12—12 of FIGURE 11;
FIGURE 13 is an enlarged fragmentary view in section taken along along the line 13—13 of FIGURE 10;
FIGURE 14 is a fragmentary front elevation view of a damper shown in closed position;
FIGURE 15 is a front elevation view of a damper shown in partly open position;
FIGURE 16 is an enlarged end elevation view of one end of a grid roller; and
FIGURE 17 is an enlarged end elevation view of the other end of a grid roller.

The hamburger broiler and grill 20 has a housing 21 comprising a base 22 and a cover or hood 23. The design, construction, assembly, size and shape of the housing 21 including the base 22 and hood 23 may be varied considerably without departing from the scope of this invention. However, a suitable housing, base and hood are described for illustrative purposes.

The base 22 is formed of stainless steel with a front panel 24, a back panel 25, end panels 26 and 27, and a bottom panel 28. The upper edges of the front, back and end panels 24, 25, 26, and 27 have inturned flanges 29, 30, 31, and 32, respectively. The flange 30 is wider than the others but terminates in an edge 33 that is spaced from the end wall 26, as shown in FIGURES 6 and 7.

An upper frame 36 is formed of a relatively heavy-duty, stainless steel channel 37 having upper and lower flanges 38 and 39, the channel 37 being formed to a rectangular frame with its lower flanges 39 resting on the flanges 29, 30, 31, and 32 and being fastened thereto by a plurality of bolts or metal screws 40. One side of the upper flange 38 has a plurality of uniformly spaced slots 41 in it for a purpose to appear (see FIGURES 1, 6 and 11). An end plate 42 overlies and is fastened to the upper flange 38 at the loading end of the machine.

The hood or cover 23 has a front wall 44, a back wall 45, end walls 46 and 47, and a top wall 48. A piano hinge 49 is fastened by rivets or screws to the back wall 45 and to the frame 36 to connect the hood to the frame. Any other conventional hinge arrangement may be used to fasten the hood 23 to the base 22, including hinges that permit quick removal of the hood for cleaning or servicing. Inturned flanges 51 and 52 on the front and back walls 44 and 45 of the hood rest upon the upper flanges 38 of the channel frame 37, as shown in FIGURE 11, when the hood is closed. A handle 53 fastened to the front wall 44 permits easy opening and closing of the hood 21.

As shown in FIGURE 7, the end walls 46 and 47 of the hood 21 have lower edges 54 and 55, respectively, spaced above the lower inturned flanges 51 and 52, and outwardly angled skirts 56 and 57 are riveted to the end walls 46 and 47 adjacent these lower edges 54 and 55.

There is an opening 60 through the front wall 24 of the base 22, and a drip pan 61 is slidable through the opening 60. The drip pan 61 rests upon bosses 62 formed on the upper surface of the bottom wall 28 of the base 22. A pair of handles 63 are mounted on the front of the drip pan 61 to facilitate its removal and replacement.

Referring now to FIGURES 7–13, and particularly to FIGURE 11, the extended flange 30 on the base 22 of the housing 21 supports an upper chain guide 66. The chain guide 66 is assembled from two mutually facing extrusions 67 and 68, each having a vertical side wall 69 and an inwardly extending bottom wall 70. The bottom walls 70 butt against opposite sides of a steel bearing plate 71, the upper surface 72 of which projects above the walls 70. The extrusions 67 and 68 and the steel bearing plate 71 are held assembled by a plurality of bolts 73 and the assembled upper chain guide 66 is welded or otherwise fastened to the extended flange 30. There may be spaced vertical supports extending from the bottom wall 28 of the base 22 for added structural support of the flange 30, but such supports are not shown in the drawing.

The upper chain guide 66 supports a row of sprocket wheels 76. Each sprocket wheel 76 has a shaft 77 extending to one side and journaled within an opening 78 in the vertical wall 69 of the extrusions 68, and has another shaft 79 extending from the other side and journaled in a sleeve bearing 80 mounted in an opening 81 in the vertical wall 69 of the extrusion 67. A short, flat-sided stud 82 extends from the end of the shaft 79.

A plurality of grid rollers 85 are positioned between the shaft 79 and the opposing side of the channel frame 37. Each grid roller 85 has a polygonal cross-section with a plurality of flat sides 86 and is formed of either solid or hollow steel. Each grid roller 85 has opposite ends 87 and 88. There is an opening 89 in the end 87 into which a short shaft 90 extends and is welded. At the other end 88, there is a flat-sided opening or recess 91 complementary in shape to and adapted to receive the flat-sided stud 82 projecting from the sprocket wheel shaft 79.

There is a bar 92 fastened by screws or bolts 93 to the inner side of the channel member 37 on the side that has the slots 41. The bar is positioned between the upper and lower flanges 38 and 49 and has a plurality of slots 94 aligned in a row beneath the slots 41. The slots 94 extend from the upper edge of the bar 92 but terminate short of its lower edge and are adapted to support the short shafts 90 on the ends of the grid rollers 85.

As shown in FIGURE 7, the adjacent grid rollers 85 are positioned in close proximity to one another and extend in a row over substantially the entire length of the housing 21.

Spaced below the extended flange 30, a plate 95 is welded to the wall 25 of the base 22 and projects inwardly therefrom. A steel bar 96 is welded to the plate 95. The bar 96 has a flat upper surface 97 that acts as a lower chain guide.

As shown in FIGURES 8 and 11, a sleeve 98 is welded to the wall 25 of the base 22, above the plate 95 and near the wall 26. A shaft 99 is rotatably journaled within the sleeve 98 and has a lock ring 100 fixed to it and bearing against the outer surface of the wall 25. An idler sprocket wheel 101 is fastened to the shaft 99 by setscrews 102 extending through its opposite hubs 103. The shaft 99 also supports a power transmitting driven sprocket wheel 104 fastened to the shaft 99 by a setscrew 105 extending through its hub 106.

As shown in FIGURE 10, there is another sleeve 108 welded to the wall 25 above the plate 95, and the sleeve 108 is positioned adjacent the wall 27 of the base 22. A shaft 109 is rotatably journaled within the sleeve 108 and the lock ring 110 is fixed to the outer end of the shaft 109 and bears against the wall 25. Another idler sprocket wheel 111 is fixed to the inner end of the shaft 109 with its hub 112 bearing against the inner end of the sleeve 108.

A drive motor 113 is mounted on the bottom wall of the base 22 adjacent the load end wall 26. A driving sprocket wheel 114 is fixed to the motor output shaft 115, as shown in FIGURES 6, 7, and 8.

There are a pair of sprocket chains 117 and 118 in the drive train. The sprocket chain 117 is of the conventional construction. The chain 118 comprises opposed pairs of links 119 connected together in series by pins 120 with rollers 121 mounted on the pins 120 between the pairs of links 119. The sprocket chain 117 is wound around the driving sprocket wheel 114 and the driven sprocket wheel 104, as shown in FIGURES 6 and 7. The other sprocket chain 118 rides with its rollers 121 bearing against the lower chain guide surface 97 of the lower chain guide 96, is wound about the load and discharge end idler sprocket wheels 104 and 111, and rides on the guide surface 72 of the upper chain guide 71. The upper chain guide 71 is so positioned relative to the row of sprocket wheels 76 that the chain, as it is guided by the upper chain guide surface 72, meshes with the sprocket wheels 76. The lower chain guide 96 keeps the lower pass of the sprocket chain 118 from sagging.

Various support plates, bars and the like have been described for supporting the several sprocket wheels and chains. Obviously, other suitable supports could be used.

At the load end of the housing 21, there is a grease spill pan 124 mounted on a supporting plate 125 that is welded to the bottom wall 128 of the base 22. The pan 124 has a downwardly inclined chute 126 that opens above the grease pan 61, as shown in FIGURE 7. Actually, very little, if any, grease will be created ahead of the cooking area, but the pan 124 and chute 126 give protection against transmission of heat from the cooking area to the area of the motor 113.

There is a heater assembly 130 mounted in the hood 123. The heater assembly 130 may be either gas or electric, and in the form illustrated, comprises two electric coils 131 and 132. A different number of coils may be used if desired or if a different size unit is built. On the front wall 25 of the base 22, there are rheostats 133 and 134 for the coils 131 and 132, each rheostat 133 and 134 providing independent heat control for the coils 131 and 132, respectively. There is also an "on"-"off" switch 135 to connect and disconnect the power supply to both coils and to the motor 113. The "on"-"off" switch may have different positions for setting different speeds for the motor 113, or a separate control may be provided for that purpose. A cord 136 from the back of the housing 121 permits connection to a standard 110 volt AC outlet, and another cord 137 provides electrical connections to the coils 131 and 132. Details of the wiring are not shown, but are conventional.

Finally, on the front wall 25 of the base 22, there are spaced dampers 138, 139, and 140 of conventional construction, each being pivotally mounted on a screw 141 and being rotatable on the screw 141 to selectively block and unblock different numbers of holes 142 which extend through the wall 24 to admit damper air into the area beneath the grid rollers 85.

*Operation*

The rollers 85 which are positioned beyond the end wall 54 of the hood 23, toward the end wall 26 of the base 22, provide a loading area for the broiler and grid 20. Hamburger patties, illustrated by broken lines in FIGURES 7 and 9, are placed on these loading rollers 85, and thereafter, broiling and grilling of the hamburgers is done automatically without any further attention required by the operator.

With the toggle switch 135 in the "on" position and set for a desired motor speed, and the rheostats 133 and 134 adjusted to the desired cooking temperature, and with the dampers 138, 139 and 140 properly adjusted to admit air into the area of the base below the grid rollers which are beneath the hood 22, optimum and uniform cooking conditions are maintained. Since the switch 135 controls the supply of power to both the heating coils 131 and 132 and the motor 113, the meat is moved across the grid rollers 85 and it is cooked.

Operation of the motor 113 causes its driving sprocket wheel 114 to rotate, and the sprocket chain 117 causes the sprocket wheel 104 to rotate. Rotation of the sprocket wheel 104 rotates the shaft 99 and the sprocket wheel 101 about which the sprocket chain 118 is wound. Hence, the sprocket chain 118 is driven, and the directions of rotation of the various sprocket wheels are such that the sprocket chain 118 moves in a counterclockwise direction as viewed in FIGURE 7 or in a direction that causes its upper path to move to the left. As the sprocket chain 118 moves, its rollers 121 on the upper pass slide or roll along the upper chain guide surface 72, holding the sprocket chain in mesh with the row of sprocket wheels 76, as particularly shown in FIGURE 12. This rotates the sprocket wheels 76 in a clockwise direction as viewed in FIGURE 12 and rotates the grid rollers 85 in a clockwise direction as viewed in FIGURE 7.

As the grid rollers 85 rotate, they transfer the hamburger patties progressively to the upper surfaces of all the grid rollers 85, moving the hamburger patties from the loading end at the left as viewed in FIGURE 7 across the entire series of grid rollers 85 to the discharge end at the right as viewed in FIGURE 7. As the patties approach the area beneath the hood 23, they are moved onto the surfaces of progressively warmer rollers since the heat from the coils 131 and 132 raises the temperature of some of the rollers beyond the wall 46 of the hood. Also, as the rollers 85 rotate, they present a constantly moving surface that prevents the patties from sticking to them.

As the patties enter the area beneath the hood 23, simultaneous broiling and grilling begins. Broiling is done from above by the radiant heat from the coils 131 and 132. Grilling is done from below by direct contact with the grid rollers 85 which are kept heated by the heat from the coils 131 and 132. It has been found that, for best conduction and retention of heat, the grid rollers 85 should be steel. Even when foods are moving along the grid rollers, the grid rollers are heated directly at the areas between food portions, and the steel construction causes the grid rollers to conduct the heat over their entire lengths. Adjustment of the dampers 138, 139, and 140 is selected for adequate cooling of the grid rollers 85 to prevent over-rapid grilling.

The setting of the rheostats 133 and 134 is such as to produce the proper intensity of broiling heat from the coils 131 and 132 and corresponding grilling heat from the rollers 85 according to the length of time it takes for a patty to travel through the area beneath the hood 23, with the result that, when the patties reach the final rollers 85 at the discharge end, they are perfectly cooked. The patties are driven by the last rollers or roller 85 beyond the end of the channel member 37 and tip from the housing onto the inclined chute 135 or other conveying means which delivers the cooked hamburgers to a collecting pan or tray.

For mass production cooking of hamburgers, the broiler and grid is kept fully loaded at all times, as indicated in FIGURES 7 and 9. The broiler and grid illustrated is generally about the proper size for two rows of hamburger patties passing through the unit, but, obviously, other sizes of units may be constructed. In the one illustrated, as soon as the last loaded pattiees are carried toward the hood 23 and expose a sufficient number of grid rollers 85 at the loading end, two more patties may be placed on the loading grid rollers. By this process, the broiler and grill 20 constantly and automatically maintains high volume and automatic cooking of the hamburgers.

Since the grid rollers 85 grill the hamburger patties from below, and the coils 131 and 132 broil them from above, no turning of the patties is necessary, and the combination of grilling from below and broiling from above maintains a maximum of the meat juices in the patty. Whatever meat juices fall are deposited into the pan 61 which can be easily removed from time to time for emptying.

Since the heating coils 131 and 132 are independently controllable by their independent rheostats 133 and 134, different temperatures of the coils may be maintained for different degrees of cooking of the hamburgers or for cooking or heating different food products. For example, a row of hamburger patties may be passed through the cooking area beneath one coil 131 while a row of hamburger buns are passed through beneath the other coil 132, and with the temperature of the coil 132 held low, the buns are simply toasted while the hamburgers are cooked by the hotter coil 131.

The grid rollers 85 can be easily moved for cleaning. The ends carrying the short shafts 90 are simply lifted pivoting the grid rollers about the studs 82, with the short shafts passing through the slots 94 and 41. Then the grid rollers 85 are pulled to withdraw them from the studs 82. The grid rollers can be washed in a dishwasher.

Various changes and modifications may be made within the purview of this invention as will be readily apparent to those skilled in the art. Such changes and modifications are within the scope and teaching of this invention as defined by the claims appended hereto.

What is claimed is:

1. A broiler and grill for cooking and heating food products comprising a housing, a cooking area within the housing, means for generating cooking heat in the cooking area, a plurality of parallel rollers supported in a plane over a substantial portion of the length of the housing for receiving food products on their upper surfaces and, upon rotation, for conveying the food products from one end of the housing to the other end of the housing, through the cooking area, the rollers having non-porous, non-foraminous surfaces and being of heat conductive material, and means to simultaneously rotate the rollers in uniform directions, said housing comprising a hood overlying a portion of the rollers and said heat generating means being mounted in said hood spaced above the rollers for heating the rollers and for broiling food products from above while said food products are being conveyed and grilled by the heated rollers.

2. The broiler and grill of claim 1 wherein the means for providing heat in the cooking area comprises separate heating units, and a separate temperature control for each heating unit to permit independent regulation of the degree of heat emitted from each unit.

3. The broiler and grill of claim 1 wherein the housing has an enclosed area below the rollers, and a plurality of dampers for admitting cooling air to the area below the rollers for adjustably controlling the temperature of the rollers as they are heated by the heating units.

4. A broiler and grill for cooking and heating food products comprising a housing having an open upper end, a plurality of grid rollers positioned parallel to one another in a plane adjacent the upper end of the housing, the grid rollers having non-porous, non-formainous surfaces and being of heat conductive material, each grid roller having a first end rotatably and removably supported by a side of the housing, a sprocket wheel for a second end of each grid roller, each sprocket wheel having a removable pin and socket connection to a grid roller with complementary flat sides to provide driving connections between the sprocket wheels and rollers while permitting removal of the rollers, a chain guide comprising an elongated bar having an upper horizontal surface spaced immediately below the row of sprocket wheels, a sprocket chain arranged in a loop with an upper pass extending between the chain guide and the sprocket wheels, the space between the chain guide and the sprocket wheels being such as to hold the sprocket chain in mesh with the sprocket wheels, means to move the sprocket chain to rotate the grid rollers, a hood overlying at least a substantial portion of the grid rollers, and heating and cooking elements mounted in the hood for cooking and heating food products placed on the grid rollers and moved by the grid rollers to the area beneath the hood.

5. The broiler and grill of claim 4 wherein the hood has openings at opposite ends in the path of food products conveyed by the rollers.

6. A broiler and grill comprising a housing having a loading end and a discharge end, a plurality of rollers, the rollers having non-porous, non-foraminous surfaces and being of heat conductive material, each roller having ends rotatably supported in stationary bearing supports defined in the housing, the rollers being parallel in a row over a substantial portion of the length of the housing, means to rotate the rollers in uniform directions to move the upper surfaces in a direction away from the loading end and toward the discharge end and thereby convey food products deposited upon those rollers adjacent the loading end of the housing successively over the rollers to the discharge end, a hood overlying a portion of the rollers, and heating means in the hood spaced above the rollers for heating the rollers and for broiling food products on the rollers as the heated rollers grill the food products.

7. The broiler and grill of claim 6 wherein the heating means comprise separate heating units positioned over separate paths of food products conveyed by the rollers, and a separate control for regulating the heat transmitted by each heating unit.

8. The broiler and grill of claim 6 wherein the rollers are polygonal in cross-section.

9. The broiler and grill of claim 6 wherein the rollers are removable.

10. A broiler and grill comprising a housing, a plurality of parallel grid rollers rotatably supported by the housing, the grid rollers having polygonal cross-sections, means to rotate the grid rollers in situ in uniform directions to cause the grid rollers to convey food products deposited upon them from one end of the housing toward the other, and means for cooking the food products as the food products are conveyed by the rollers.

11. A broiler comprising a housing having openings at opposite ends and heating means therein, a plurality of polygonal rollers mounted below and exposed to the heating means, means for rotating the rollers in a uniform direction to convey food products over the rollers and below the heating means, entering through one opening and discharging through the opposite opening within a predetermined time.

References Cited

UNITED STATES PATENTS

| 1,567,330 | 12/1925 | Peale. | |
| 1,662,847 | 3/1928 | Cook | 99—443 |
| 2,335,618 | 11/1943 | Thompson | 198—127 XR |
| 2,535,890 | 12/1950 | Bouck | 198—127 XR |
| 2,604,842 | 7/1952 | Dolce | 99—423 |
| 2,697,395 | 12/1954 | Steriss | 99—423 |
| 3,239,651 | 3/1966 | Silberman | 219—388 |
| 3,257,935 | 6/1966 | Temperato | 99—386 |
| 3,310,007 | 3/1967 | Ford | 107—57 |
| 3,340,794 | 9/1967 | Giuliano. | |

FOREIGN PATENTS 732,897   6/1955   Great Britain.

WALTER A. SCHEEL, *Primary Examiner.*

JOHN M. NEARY, *Assistant Examiner.*

U.S. Cl. X.R.

99—386, 443; 198—127